United States Patent [19]

Bucherl et al.

[11] 3,854,659

[45] Dec. 17, 1974

[54] FREQUENCY SELECTIVE CIRCUIT ARRANGEMENTS

[75] Inventors: Erwin Bucherl, Munich; Walter Peters, Taufkirchen, both of Germany

[73] Assignee: Siemens Aktiengesellschaft, Berlin and Munich, Germany

[22] Filed: July 30, 1973

[21] Appl. No.: 383,992

[30] Foreign Application Priority Data

July 31, 1972 Germany.......................... 2237578

[52] U.S. Cl................ 333/28 R, 333/81 R, 333/75

[51] Int. Cl........................... H03h 7/10, H03h 7/14

[58] Field of Search.................. 333/16, 28 R, 81 R

[56] References Cited

UNITED STATES PATENTS

| | | | |
|---|---|---|---|
| 2,718,622 | 9/1955 | Harkless | 333/28 R |
| 2,820,205 | 1/1958 | VanDoorn | 333/28 R |
| 3,621,480 | 11/1971 | Brownlie | 333/28 R |

*Primary Examiner*—Paul L. Gensler

*Attorney, Agent, or Firm*—Hill, Gross, Simpson, Van Santen, Steadman, Chiara & Simpson

[57] ABSTRACT

A frequency selective circuit arrangement having a resistor network connected to a supply line and feeding an auxiliary four terminal filter network whose attenuation characteristic curve is variable under the control of means for varying the terminating resistance of said four terminal network, the impedance of the elements having a predetermined frequency position for the peaks of the attenuation characteristic of the arrangement.

6 Claims, 4 Drawing Figures

FREQUENCY SELECTIVE CIRCUIT ARRANGEMENTS

BACKGROUND OF THE INVENTION

The invention relates to frequency selective circuit arrangements suitable for use as an adjustable correcting device, in which a network consisting of resistors is assigned an auxiliary four terminal fliter network, and the attenuation characteristic curve is adjusted by varying the terminating impedance of the auxiliary four termial network.

For the monitoring and control of carrier frequency telecommunication systems, as is well known, pilot signals are normally transmitted as additional signals at the borders of the transmission bands. The levels of these signals are set at specific, predetermined values with the aid of adjustable correcting devices, which are also referred to as Bode variable equalizers. In correcting devices of this type a network composed of resistors is assigned one or a plurality of auxiliary four terminal networks, and adjustment of the attenuation characteristic is provided by terminating the auxiliary four terminal network with a variable terminating impedance. The terminating impedance itself can take the form of a potentiometer for example, or a switch provided with fixed resistances, or any circuit arrangement operating to similar effect. At higher frequencies, for example in the range around 60 MHz, the transmission properties of the correcting device obviously become increasingly subject to interference because the parasitic effects of the circuitry modules employed for the variation of any terminating impedance become increasingly manifest, and this applies in particular to the supply line inductance, and to the parallel capacitance presented by any such circuitry modules.

One object of the present invention is to provide an arrangement which substantially avoids the aforementioned difficulties in a relatively simple fashion; and provides for compensation of aforementioned parasitic circuit elements.

SUMMARY OF THE INVENTION

The invention consists in a frequency selective circuit arrangement for use as an adjustable correcting device, in which a resistor network is provided for connection between a signal supply line and an auxiliary four-terminal network whose characteristic curve plotting attenuation is varied by adjustment of the terminating impedance of the four-terminal network, the self-capacitance $C_e$ and the supply line inductance $L_z$ of a variable terminating resistance $R_a$ being compensated by a reactive half section filter combination having a series arm which contains a capacitor $C_k$ having a capacitance equal to $1/\omega_m^2 L_z$ and a shunt arm which contains a coil $L_k$ having an inductance equal to $1/\omega_m^2 C_e$, said filter combination being arranged in such manner that said coil is connected nearest to said four-terminal network, and fm, which is $\omega_m/2\pi$, signifies the frequency at which the attenuation extreme values occurs.

BRIEF DESCRIPTION OF THE DRAWING

The invention will now be described with reference to the drawings, in which.

DESCRIPTION OF THE PREFERRED EMBODIMENTS

Figure 1:
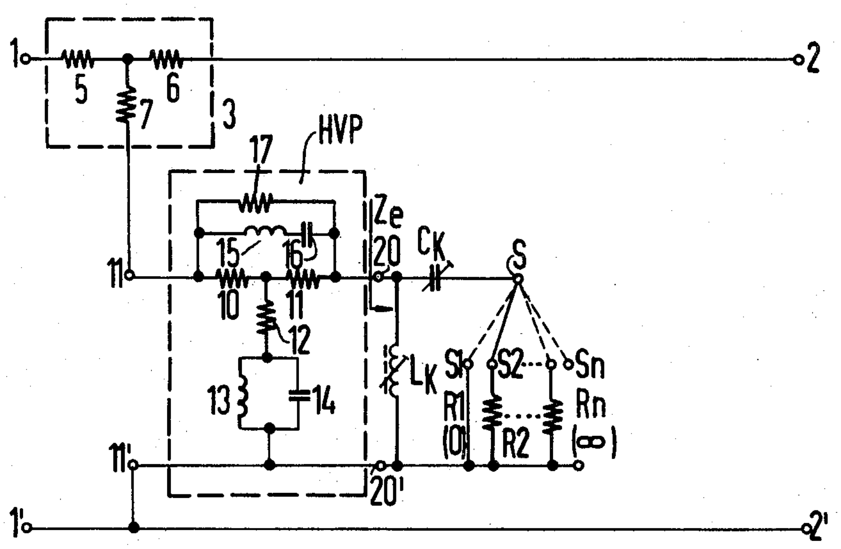
FIG. 1 is a circuit diagram of one exemplary embodiment of an adjustable correcting device constructed in accordance with the invention.

The exemplary embodiment shown in FIG. 1 is a circuit for an adjustable correcting device which is designed as passive four-terminal network with input terminals 1 and 1′ and output terminals 2 and 2′. The input terminal 1′ and the output terminal 2′ are electrically connected directly to one another and can thus carry a fixed reference potential, for example earth potential. The correcting device itself consists of a resistor network 3 containing resistors 5, 6 and 7, which are connected as a T-element with the resistors 5 and 6 in series arms and the resistor 7 in a shunt arm. Following the resistor 7 in its shunt arm, the network 3 is connected to an auxiliary four-terminal network HVP, having input terminals 11 and 11′, and output terminals 20 and 20′.

In the exemplary embodiment shown the auxiliary four terminal network itself consists of a bridged-T element, with resistors 10 and 11 in series arms and the series connection of a resistor 12 and a parallel resonant circuit comprising the combination of a coil 13 and a capacitor 14 in a shunt arm.

A bridging arm in parallel with the combined series arms contains the parallel connection of a series resonant circuit with a coil 15 and a capacitor 16, and this combination is shunted by a resistor 17. The auxiliary four-terminal network itself is terminated by a switch S, the individual switching positions of which are S1, S2 to S*n*, separate switch positions being assigned respective resistors or links R1, R2 to R*n*. The smallest resistor R1 is a link formed by a direct short circuit and thus possesses the effective resistance value zero, whilst the largest resistor R*n* is represented as an open-circuit no-load theoretical resistor, possessing an infinite value. The terminals 11′ and 20′ of the auxiliary four-terminal network are electrically connected directly together and directly connected to the line connecting the terminals 1′ and 2′.

Figure 2:
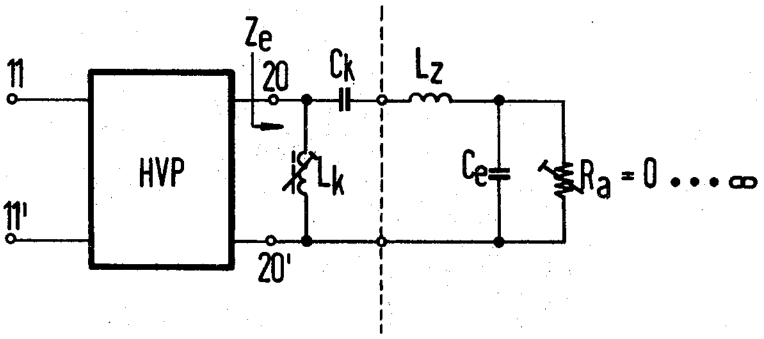
FIG. 2 is a block schematic diagram of part of the circuit shown in FIG. 1.

FIG. 2 represents the auxiliary four-terminal network HVP, and the resistors or links R1 to R*n* have been symbolized by a variable terminating resistance $R_a$ whose value is variable between zero and infinity.

The design of such correcting devices is well known, and it will not be necessary to discuss them in detail here. It is also known to use a plurality of terminated auxiliary four-terminal networks in this type of correcting device, as indicated by a broken line in FIG. 1, which, for example, in the circuit represented in FIG. 1 would mean that it would be necessary to bridge the resistance network 3 by a dual auxiliary four-terminal network which would complement the auxiliary four-terminal net work HVP and would be terminated with a variable resistance. It is also possible to use auxiliary four-terminal networks effective at different frequencies.

It is a known fact that the direction and the size of the attenuation variation produced by the correcting device is determined by the size of the terminating resistance $R_a$. The positive and negative maximum variation, relative to the basic attenuation, are assigned the resistance extreme values $R_a = O$ and $R_a = \infty$. The frequency $f_m$ is that at which the attenuation extremes occur. In the case of the exemplary embodiment shown in FIG. 1, this means that the number of resistors R$n$ must be selected to be in accordance with the number of desired attenuation variations.

As will be seen from FIG. 2, the terminating resistance $R_a$ includes parasitic circuit elements, which become manifest in particular as a self-capacitance $C_e$ which lies parallel to the resistance $R_a$, and a supply line inductance $L_z$ connected in series to this parallel circuit, and as already stated, these impermissibly alter the transmission behaviour of the correcting device.

The invention is based upon the consideration that in adjustable correcting devices of this kind having a narrow variation range, such as pilot correcting devices for example, the adjustable terminating resistances of the auxiliary four-terminal network or networks influence the frequency response only within the variation range, and that it is thus permissible to compensate the parasitic elements on a narrow band in simple fashion if the compensation is contrived to be such that is transforms arbitrary terminal resistances $0 \leq R_a \leq \infty$ as accurately as possible to itself at least one frequency, i.e., the variation middle frequency $f_m$. The errors occurring on either side of this frequency are then so slight in the width required for narrow band correcting devices that their influence on the attenuation response remains negligible.

As can be seen from FIGS. 1 and 2, the effect of the parasitic circuit elements $L_z$ and $C_e$ is compensated by connecting between the auxiliary four-terminal network HVP and the terminating resistance $R_a$ a half-section filter circuit whose shunt arm contains a coil having an inductance $L_k$ and whose series arm contains a capacitor having a capacitance $C_k$. It is to be noted that the half-section filter circuit is connected in such manner that the coil $L_k$ is directly between the output terminals of the auxiliary four-terminal network HVP. The coil $L_k$ must possess the inductance $L_1 = 1/\omega_m^2 C_e$ and the capacitor must possess the capacitance $Ck = 1/\omega_m^2 L_z$. Here $\omega_m$ is the cyclic frequency ($\omega_m = 2\pi f_m$) associated with the variation middle frequency $f_m$.

The parasitic elements $L_z$ and $C_e$ may be determined by measurement and, in dependence upon the nature of the terminating resistance, which in the case of pilot-controlled intermediate amplifiers may take the form of thermistors, it can occur that one of these elements assumes the value zero, or a value which is effectively negligible. This case is also covered by the above dimensioning rules, and when one of the elements $L_k$ or $C_k$ assumes the value infinity, in the case of the capacitor $C_k$ it can be replaced by a direct electric connection, whilst in the case of the coil $L_k$, this may then be omitted.

Figure 3:
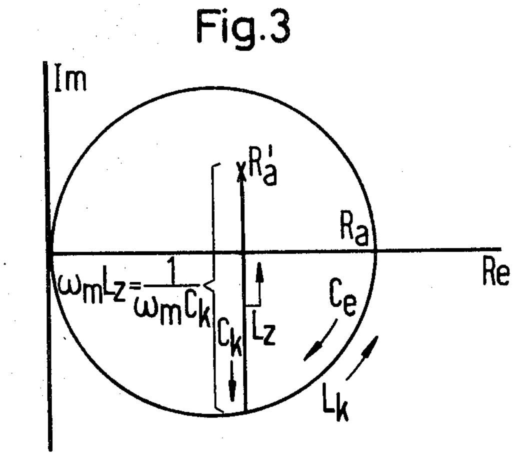
FIG. 3 is a graph showing the compensation in the complex impedance plane.

FIG. 3 shows the effect of compensation at the frequency $f_m$ in the complex resistance plane, with the real axis Re and the imaginary axis Im. The parasitic elements $C_e$ and $L_z$ transform the pure resistance $R_a$ into a complex impedance $R_a'$. This impedance $R_a'$ would also become manifest as the characteristic impedance of the auxiliary four-terminal network and thus adulterate the desired attenuation dependence of the correcting device. However, the provision of the compensation elements $C_k$ and $L_k$ ensure that the complex impedance $R_a'$ is transformed back into the effective resistance $R_a$. In FIG. 3 the transformation directions have been indicated by arrows.

The compensation applies strictly to only one frequency, i.e., the frequency $f_m$, but in the case of relatively small parasitic elements any deviation of the input impedance $Z_e$ when viewed from the auxiliary four-terminal network (compare FIGS. 1 and 2), leading to variation from the terminal resistance $R_a$, is sufficiently slight to be insignificant in the required frequency range.

The exemplary embodiment illustrated is a pilot correcting device having the variation middle frequency $f_m = 71.16$ MHz, and the values of the parasitic elements were found to be $L_z = 42$ nH and $C_e = 10$ pF. Consequently the values of the compensation elements are $L_k = 0.68\ \mu$ H and $C_k = 160$ pF.

In the case of compensation, the desired terminating resistances occur exactly at the middle frequency 61.16 MHz, and even at frequencies displaced by approximately ±3 percent from the middle frequency the deviations are still very much lower than in the non-compensated case. If one considers the values of $Z_e$ for finite terminating resistances in the frequency range $f_m[1\pm0.003]$, in the compensated case there are relative deviations of $(|Ze| - Ra)/Ra$, giving 0 to 4.6 percent whilst in the non-compensated case there are deviations of from 13 to 81 percent. In the case of a short circuit in the above mentioned frequency range the maximum resistance $|Ze|$ is 0.96Ω in the compensated case and 16.7Ω in the non-compensated case. In the case of an open-circuit no-load, instead of an infinite resistance in the compensated case we have $|Z_e|_{min} = 4133\Omega$ and in the non-compensated case $|Z_e|_m = 237\Omega$.

If the compensation elements are designed to be tunable, it is also possible to take good account of deviations in the parasitic elements.

Figure 4:
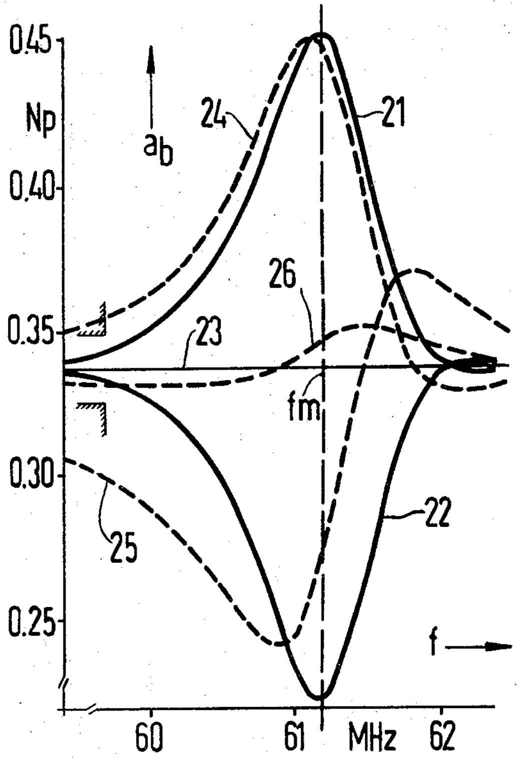
FIG. 4 is a graph showing the effect of the compensation on the desired attenuation curves.

In respect of the above-mentioned exemplary embodiment FIG. 4 shows the influence on the desired attenuation curve of the correcting device shown in FIG. 1, with attenuation $a_b$ plotted against frequency $f$. Solid lines 21, 22 and 23 show the attenuation curve characteristic when compensation is applied, and this curve practically coincides with the theoretical case. The curve 21 represents the socalled maximum attenuation variation which is achieved with a terminating resistance $R_a - 0$, and the curve 22 represents the so-called minimum attenuation variation which is achieved with a terminating resistance $R_a = \infty$, and finally the curve 23 represents the so-called switched-through state, i.e., a basic attenuation which is independent of frequency and which is achieved when the auxiliary four-terminal network is terminated with its correct characteristic impedance.

To improve clarity of the diagram no additional intermediate values have been entered, although the individual attentuation curves which are proportional to one another move between the curves 21 and 22 in accordance with the size of the terminal resistance $R_a$. Similarly, broken lines 24, 25 and 26 show the attenuation curve characteristic of the correcting device without the described compensation. As shown, there then results not only a displacement of the attenuation extremes, which could be adjusted by the resonant circuits of the auxiliary four-terminal network, but in particular an impermissible increase in the attenuation distortions at the pass band boundaries (entered as shaded angles) which cannot be controlled by other elements. The basic attenuation would also no longer be independent of frequency throughout the variation range, as shown by curve 26.

We claim as our invention:

1. A frequency selective circuit arrangement for use as an adjustable correcting device, in which a resistor network is provided for connection between a signal supply line and an auxiliary four-terminal network connected to a reference potential and the attenuation of said correcting device is varied by adjustment of the terminating impedance of said four-terminal network, the self-capacitance $C_e$ and the supply line inductance $L_z$ of a variable terminating resistance $R_a$ being compensated by a reactive half-section filter combination having a series arm which contains a capacitor $C_k$ having a capacitance equal to $1/\omega m^2 L_z$ and a shunt arm which contains a coil $L_k$ having an inductance equal to $1/\omega m^2 C_e$, said filter combination being arranged in such manner that said coil is connected nearest to said four-terminal network, and fm, which equals $\omega m/^2\pi$, signifies the variation middle frequency.

2. A circuit arrangement as claimed in claim 1, in which said resistor network is connected to a plurality of auxiliary four-terminal networks at least, one more of which is provided with said compensating circuit.

3. A circuit arrangement as claimed in claim 1, in which the terminating resistance of said auxiliary four-terminal network is comprised of a switch whose separate switch positions connect respective fixed resistances.

4. A circuit arrangement as claimed in claim 1, in which said terminating resistance of said auxiliary four-terminal network consists of a thermistor.

5. A circuit arrangement as claimed in claim 1, in which the capacitance of said series capacitor has a value of infinity.

6. A circuit arrangement as claimed in claim 1 in which the inductance of the said shunt coil has a value of infinity.

* * * * *